United States Patent [19]

Teuling et al.

[11] Patent Number: 5,703,444
[45] Date of Patent: Dec. 30, 1997

[54] SWITCHING DEVICE FOR S CORRECTION CAPACITORS

[75] Inventors: Dirk J. A. Teuling; Johannes A. C. Misdom, both of Eindhoven, Netherlands

[73] Assignee: U.S. Philips Corporation, New York, N.Y.

[21] Appl. No.: 515,555

[22] Filed: Aug. 16, 1995

[30] Foreign Application Priority Data

Aug. 18, 1994 [EP] European Pat. Off. ............ 94202346

[51] Int. Cl.⁶ .......................... H01J 29/70; H01J 29/76
[52] U.S. Cl. .......................... 315/371; 315/408
[58] Field of Search .......................... 315/371, 408

[56] References Cited

U.S. PATENT DOCUMENTS

| | | | |
|---|---|---|---|
| 4,789,811 | 12/1988 | Hulshof | 315/371 |
| 5,155,417 | 10/1992 | Tateishi | 315/371 |
| 5,325,025 | 6/1994 | Gawell et al. | 315/408 |

FOREIGN PATENT DOCUMENTS 4106990  12/1991  Germany .................. H04N 3/23

Primary Examiner—Gregory C. Issing
Attorney, Agent, or Firm—Edward W. Goodman

[57] ABSTRACT

A switching device for S correction capacitors includes parallel-arranged branches, each having a series arrangement of an S correction capacitor (Cs) and a switch (S). At one side, the parallel branches are coupled to a horizontal deflection coil (Lh). The switches (S) are controlled by a microcomputer (13) for switching S correction capacitors (Csi) parallel in dependence upon a repetition frequency of horizontal synchronizing pulses (Hs). A hardware frequency detector (11) supplies frequency information (V) related to the horizontal synchronizing pulses (Hs). A frequency change detector (12) coupled to the hardware frequency detector supplies an attention pulse (AP) to an interrupt input (INT) of the microcomputer (13) when a change of the frequency information (V) has been detected.

3 Claims, 1 Drawing Sheet 5,703,444

SWITCHING DEVICE FOR S CORRECTION CAPACITORS

BACKGROUND OF THE INVENTION

1. Field of the Invention

The invention relates to a switching device for S correction capacitors comprising a multiple number of parallel-arranged branches of switches arranged in series with corresponding S correction capacitors, in which the parallel-arranged branches are coupled at one side to a horizontal deflection coil, a control device provided with a microcomputer and having an input for receiving horizontal synchronizing pulses, said control device having means for detecting a change of a repetition frequency of the horizontal synchronizing pulses, and having outputs for supplying control signals, generated by the microcomputer, for controlling the switches in dependence upon said repetition frequency, said switches being closed if the change of said repetition frequency has been detected.

The invention also relates to a picture display device provided with the above-mentioned switching device.

2. Description of The Related Art

Such a switching device is known from German Patent Specification DE C-4106990, corresponding to U.S. Pat. No. 5,155,417. The known switching device for S correction capacitors comprises a microcomputer for operating a multiple number of switches arranged between the same multiple number of S correction capacitors and a horizontal deflection coil. The microcomputer detects a frequency change of horizontal synchronizing pulses with a software algorithm by continuously counting horizontal synchronizing pulses and by averaging the counts thus found. After detection of the frequency change, all switches are closed so as to protect the switching device from overload. Subsequently, the microcomputer maintains a plurality of switches closed in dependence upon a presented frequency of the horizontal synchronizing pulses.

It is a drawback of the known switching device that the microcomputer is continuously busy detecting whether there is a frequency change of the horizontal synchronizing pulses. A further drawback of the known switching device is that all switches are closed upon each detected frequency change.

SUMMARY OF THE INVENTION

It is, inter alia an object of the invention to provide a lower-cost switching device for S correction capacitors.

To this end a first aspect of the invention provides a switching device for S correction capacitors as set forth in the opening paragraph, characterized in that said means for detecting comprises a hardware frequency detector for supplying frequency information related to said repetition frequency, and a hardware frequency change detector coupled to the hardware frequency detector for supplying an attention pulse to an interrupt input of the microcomputer when a change of the frequency information has been detected. A second aspect of the invention provides a picture display device comprising an input terminal for receiving picture information, means for separating horizontal synchronizing pulses and a switching device for S correction capacitors comprising a multiple number of parallel-arranged branches of switches arranged in series with corresponding S correction capacitors, in which the parallel-arranged branches are coupled at one side to a horizontal deflection coil, a control device provided with a microcomputer and having an input for receiving horizontal synchronizing pulses, said control device having means for detecting a change of a repetition frequency of the horizontal synchronizing pulses, and having outputs for supplying control signals, generated by the microcomputer, for controlling the switches in dependence upon said repetition frequency, said switches being closed if the change of said repetition frequency has been detected, characterized in that said means for detecting comprises a hardware frequency detector for supplying frequency information related to said repetition frequency, and a hardware frequency change detector coupled to the hardware frequency detector for supplying an attention pulse to an interrupt input of the microcomputer when a change of the frequency information has been detected. A hardware frequency change detector detects a frequency change of the horizontal synchronizing pulses from frequency information related to the horizontal synchronizing pulses. If the frequency change occurs, the frequency change detector generates an attention pulse. The attention pulse is applied to an interrupt input of the microcomputer. The microcomputer takes the desired actions immediately after the occurrence of the attention pulse and is now no longer loaded with a continuous count of the horizontal synchronizing pulses and averaging of counts thus obtained. Consequently, it is sufficient to use a less powerful microcomputer of lower cost, while the extra costs for the hardware frequency change detector are very low.

An embodiment of the switching device according to the invention, with the characterizing features that the hardware frequency change detector comprises a differentiator and a unidirectionally sensitive level detector for generating the attention pulse only if said repetition frequency changes to a lower value, has the advantage that all switches are closed only upon a frequency change to a lower frequency. In fact, the protection of the switching device from overload is only necessary if a horizontal period becomes longer. Closing of all switches yields a maximum total S correction capacitance (all individual S correction capacitors in parallel) related to the lowest repetition frequency of the horizontal synchronizing pulses at which an optimum S correction is desired. Closing of all switches at the frequency change to the lower frequency is thus an adaptation of the value of the total S correction capacitor in the correct direction. However, when the horizontal period becomes shorter (hence a higher frequency) an optimum S correction is obtained by reducing the value of the total S correction capacitor (the chosen parallel-arranged S correction capacitors), hence by closing a smaller number of switches. First closing all switches is an action in the wrong direction, which causes an unnecessary disturbance of the geometry and may lead to a delay in achieving the desired S correction.

These and other aspects of the invention will be apparent from and elucidated with reference to the embodiments described hereinafter.

BRIEF DESCRIPTION OF THE DRAWING

In the drawing:

FIG. 2a shows an embodiment of a frequency change detector according to the, while

DESCRIPTION OF THE PREFERRED EMBODIMENT

Figure 1:
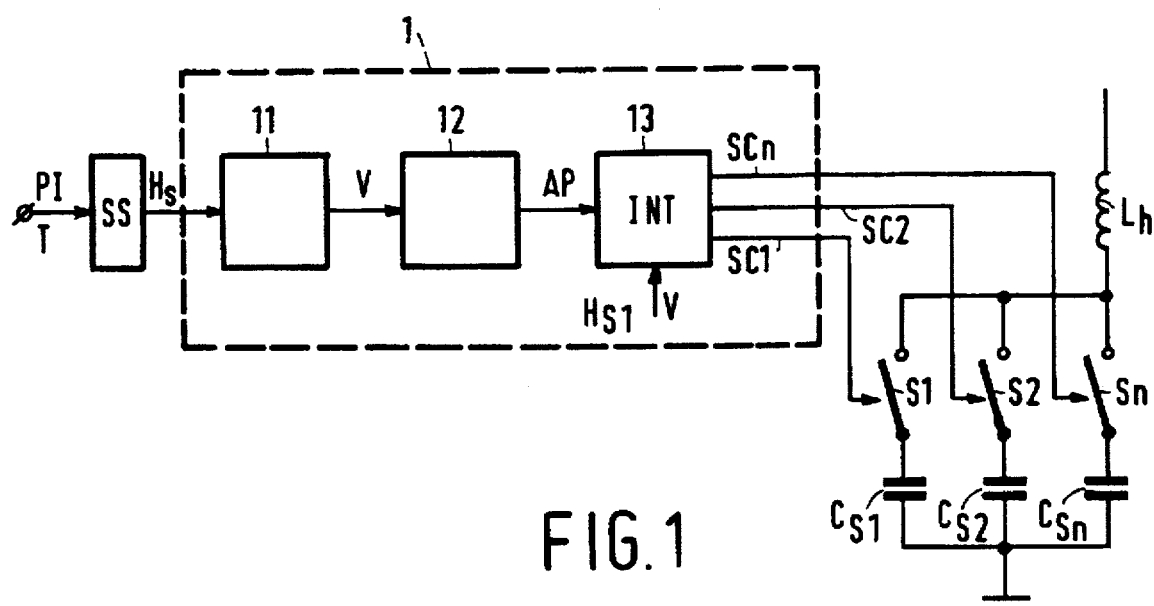
FIG. 1 shows a picture display device provided with a switching device according to the invention.

FIG. 1 shows a picture display device provided with a switching device for S correction capacitors according to the invention. Video information PI is presented to an input terminal T of a synchronizing separator SS. The synchronizing separator SS separates horizontal synchronizing pulses Hs from the video information PI. A hardware frequency detector 11 receives the horizontal synchronizing pulses Hs and supplies frequency information V related to the repetition frequency of the horizontal synchronizing pulses Hs to a hardware frequency change detector 12. The hardware frequency detector 11 may be a known phase-locked loop which supplies a voltage dependent on the repetition frequency. The hardware frequency change detector 12 supplies an attention pulse AP to an interrupt input INT of a microcomputer 13 when it detects a change of the frequency information V. The microcomputer 13 supplies switching signals Sc1, Sc2, ..., Scn for operating corresponding switches S1, S2, ..., Sn. The switches S1, S2, ..., Sn are arranged between a first terminal of corresponding S correction capacitors Cs1, Cs2, ..., Csn and a horizontal deflection coil Lh. The second terminal of each S correction capacitor Cs1, Cs2, ..., Csn is connected to ground. If the microcomputer receives an active signal at its interrupt input INT, all switches S1, S2, ..., Sn are first closed so as to prevent overload of the components Cs1, Cs2, ..., Csn; S1, S2, ..., Sn in the switching device, and in a horizontal deflection circuit coupled thereto, only the horizontal deflection coil Lh of which is shown. The microcomputer 13 further receives the horizontal synchronizing pulses Hs or the frequency information V so as to subsequently determine which switches Si must be opened so as to obtain a total S correction capacitance (the parallel arrangement of the individual S correction capacitors Ci of which the associated switches Si are closed), which capacitance is optimally adapted to the repetition frequency. Since the frequency change detector 12 is a hardware circuit, the microcomputer 13 does not need time to determine continuously whether a frequency change has taken place. The microcomputer 13 only needs to perform activities for selecting a new combination of individual S correction capacitors Si if the necessity therefor is indicated by the attention pulse AP. Consequently, a less powerful and hence less expensive microcomputer 13 can be used.

Figure 2A:
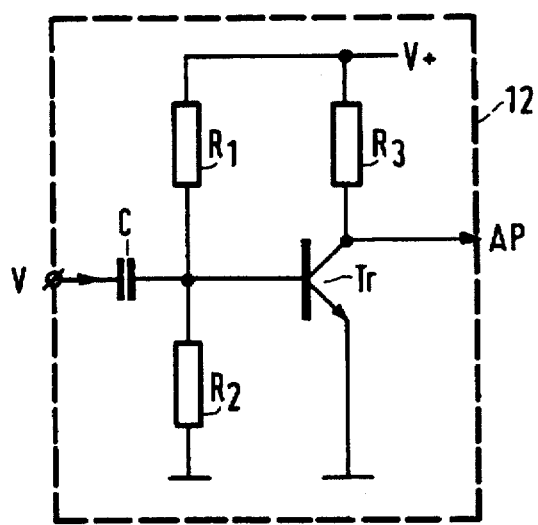

An embodiment of a frequency change detector 12 according to the invention is shown in FIG. 2a. An input terminal of the frequency change detector 12 receives the frequency information V and an output terminal supplies the attention pulse AP. To this end, a differentiator C is coupled between the input terminal and an input of a level detector R1, R2, R3, Tr. Coupled to the input of the level detector R1, R2, R3, Tr, are: a first terminal of a resistor R1, a first terminal of a second resistor R2, and a control electrode of an NPN transistor Tr. A second terminal of the second resistor R2 and an emitter of the transistor Tr are coupled to ground. A collector of the transistor Tr is coupled to a first terminal of a third resistor R3 and to the output terminal. A second terminal of the first resistor R1 and the third resistor R3 are coupled to a power supply voltage V+. By suitable choice of the first resistor R1 and the second resistor R2, the transistor Tr is adjusted in such a way that it is just turned off at a constant frequency information V.

Figure 2B:
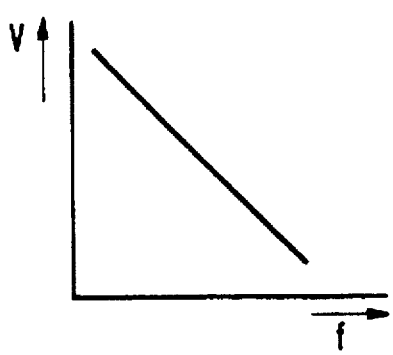
FIG. 2b shows the signal to be applied to the frequency change detector.

The shown embodiment of the frequency change detector 12 is considered to cooperate with a frequency detector 11 which generates a voltage as frequency information V which is high for a low repetition frequency of the horizontal synchronizing pulses Hs and low for a high repetition frequency, as is shown in FIG. 2b. If the repetition frequency decreases, the voltage increases and the transistor Tr is turned on via the differentiator C, the level of the attention pulse decreases to approximately ground potential, which is interpreted by the microcomputer 13 as an interrupt. If the repetition frequency increases, the voltage decreases and the transistor Tr remains turned off via the differentiator C, the attention pulse retains a high level (approximately V+) and the microcomputer 13 does not receive an interrupt.

Thus, the microcomputer 13 only receives an interrupt when the repetition frequency decreases, because only in this situation, an overload of the components Csi, Si in the switching device and the horizontal deflection circuit coupled thereto may be produced. After receiving the interrupt, the microcomputer 13 immediately switches on all switches Si.

Since the microcomputer 13 does not receive an interrupt if the repetition frequency increases, the microcomputer will have to determine at regular intervals whether said repetition frequency has changed so as to subsequently select the correct combination of individual S correction capacitors Csi. Said regular intervals may be, for example, once per second. It is alternatively possible to add a second frequency change detector which generates a second attention pulse for supply to a second interrupt input of the microcomputer 13. The second attention pulse becomes active if the repetition frequency increases, and the microcomputer 13 can then immediately determine the repetition frequency and select the correct combination of the capacitors Csi without first closing all switches. Alternatively, the second attention pulse may be applied to an input of the microcomputer 13, which is not an interrupt input. The microcomputer regularly checks whether the attention pulse has become active so as to subsequently determine the repetition frequency and select the correct combination of the capacitors Csi without first closing all switches.

It is to be noted that the embodiments described hereinbefore illustrate rather than limit the invention and that those skilled in the art will be able to conceive many alternative embodiments without passing beyond the protective scope of the invention described in the appendant claims.

It will be evident that the switching device also operates if all polarities are reversed. If the frequency detector 11 generates a voltage as frequency information V which is low for a low value of the repetition frequency and high for a high value of the repetition frequency, the level detector R1, R2, R3, Tr is to generate an attention pulse if the voltage decreases.

The active level to be presented to the interrupt input INT is dependent on the type of microcomputer 13. A correction of the polarity of the active level of the attention pulse AP can easily be obtained by arranging a known reversing circuit between the output terminal and the junction point of the third resistor R3 and the collector of the transistor Tr.

Other components which are necessary in a horizontal deflection circuit, such as a linearity coils may be arranged between the horizontal deflection coil Lh and the parallel-arranged branches of switches S which are arranged in series with corresponding S correction capacitors Cs and which parallel-arranged branches are coupled to the horizontal deflection coil.

We claim:

1. A switching device for S correction capacitors, comprising:
   a multiple number of parallel-arranged branches of switches arranged in series with corresponding S correction capacitors, in which the parallel-arranged branches are coupled at one side to a horizontal deflection coil;

a control device provided with a microcomputer and having an input for receiving horizontal synchronizing pulses, said control device having means for detecting a change of a repetition frequency of the horizontal synchronizing pulses, and having outputs for supplying control signals, generated by the microcomputer, for controlling the switches in dependence upon said repetition frequency, said switches being closed if the change of said repetition frequency has been detected, characterized in that the device said means for detecting comprises:

a hardware frequency detector for supplying frequency information related to said repetition frequency; and a hardware frequency change detector coupled to the hardware frequency detector for supplying an attention pulse to an interrupt input of the microcomputer when a change of the frequency information has been detected.

2. A switching device for S correction capacitors as claimed in claim 1, characterized in that the hardware frequency change detector comprises a differentiator and a unidirectionally sensitive level detector for generating the attention pulse only if said repetition frequency changes to a lower value.

3. A picture display device comprising an input terminal for receiving picture information, means for separating horizontal synchronizing pulses and a switching device for S correction capacitors comprising:

a multiple number of parallel-arranged branches of switches arranged in series with corresponding S correction capacitors, in which the parallel-arranged branches are coupled at one side to a horizontal deflection coil;

a control device provided with a microcomputer and having an input for receiving horizontal synchronizing pulses, said control device having means for detecting a change of a repetition frequency of the horizontal synchronizing pulses, and having outputs for supplying control signals, generated by the microcomputer, for controlling the switches in dependence upon said repetition frequency, said switches being closed if the change of said repetition frequency has been detected, characterized in that said means for detecting comprises:

a hardware frequency detector for supplying frequency information related to said repetition frequency, and a hardware frequency change detector coupled to the hardware frequency detector for supplying an attention pulse to an interrupt input of the microcomputer when a change of the frequency information has been detected.

* * * * *